(12) United States Patent
Hustava et al.

(10) Patent No.: US 12,607,741 B2
(45) Date of Patent: *Apr. 21, 2026

(54) ACOUSTIC SENSING OF PROXIMATE OBSTACLES

(71) Applicant: SEMICONDUCTOR COMPONENTS INDUSTRIES, LLC, Scottsdale, AZ (US)

(72) Inventors: Marek Hustava, Bratislava (SK); Pavel Kostelnik, Bordovice (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 42 days.

This patent is subject to a terminal disclaimer.

(21) Appl. No.: 18/825,832

(22) Filed: Sep. 5, 2024

(65) Prior Publication Data

US 2025/0067870 A1 Feb. 27, 2025

Related U.S. Application Data

(63) Continuation of application No. 18/299,928, filed on Apr. 13, 2023, now Pat. No. 12,111,395.

(60) Provisional application No. 63/482,188, filed on Jan. 30, 2023, provisional application No. 63/482,183, filed on Jan. 30, 2023.

(51) Int. Cl.
| | |
|---|---|
| *G01S 15/931* | (2020.01) |
| *G01S 7/52* | (2006.01) |
| *G01S 7/523* | (2006.01) |
| *G01S 7/527* | (2006.01) |

| | |
|---|---|
| *G01S 7/536* | (2006.01) |
| *G01S 15/10* | (2006.01) |

(52) U.S. Cl.
CPC ........ *G01S 15/931* (2013.01); *G01S 7/52004* (2013.01); *G01S 7/523* (2013.01); *G01S 7/527* (2013.01); *G01S 7/536* (2013.01); *G01S 15/10* (2013.01); *G01S 15/101* (2013.01)

(58) Field of Classification Search
CPC .... G01S 15/931; G01S 7/52004; G01S 7/523; G01S 7/527; G01S 7/536; G01S 15/10; G01S 15/101
See application file for complete search history.

(56) References Cited

U.S. PATENT DOCUMENTS

| | | | |
|---|---|---|---|
| 5,079,751 | A | 1/1992 | Woodward |
| 7,713,199 | B2 | 5/2010 | Mo et al. |
| | | (Continued) | |

FOREIGN PATENT DOCUMENTS

| | | |
|---|---|---|
| CN | 108663296 A | 10/2018 |
| CN | 111880183 A | 11/2020 |

*Primary Examiner* — John A Tweel, Jr.
(74) *Attorney, Agent, or Firm* — Ramey LLP

(57) ABSTRACT

An illustrative controller includes: a transmitter to drive an acoustic transducer to generate a first acoustic burst and a second acoustic burst; a receiver coupled to the acoustic transducer to sense a first response to the first acoustic burst and a second response to the second acoustic burst; and a processing circuit to derive output data from the first and second responses in part by determining an offset frequency difference between the first and second responses, wherein the first acoustic burst has a first characteristic frequency and the second acoustic burst has a second characteristic frequency different from the first characteristic frequency.

20 Claims, 4 Drawing Sheets

(56) References Cited

U.S. PATENT DOCUMENTS

| | | | | |
|---|---|---|---|---|
| 7,957,223 | B2 * | 6/2011 | Hafer | G01S 15/10 |
| | | | | 367/99 |
| 11,269,068 | B2 * | 3/2022 | Hustava | G01S 7/52004 |
| 11,353,567 | B2 * | 6/2022 | Hustava | G01S 7/527 |
| 11,378,672 | B2 * | 7/2022 | Werner | H04W 64/006 |
| 11,443,728 | B2 * | 9/2022 | Hustava | G10K 11/17825 |
| 11,520,027 | B2 * | 12/2022 | Suchy | G01S 15/931 |
| 11,770,975 | B2 * | 9/2023 | Chang | G01V 13/00 |
| 11,982,740 | B2 * | 5/2024 | Hustava | G01S 15/104 |
| 12,111,395 | B2 * | 10/2024 | Hustava | G01S 7/536 |
| 12,228,641 | B2 * | 2/2025 | Hustava | B60R 21/01536 |
| 2022/0080960 | A1 * | 3/2022 | Hawes | G01S 15/08 |
| 2024/0411017 | A1 * | 12/2024 | Ding | G01S 15/102 |

* cited by examiner

FIG. 4

ACOUSTIC SENSING OF PROXIMATE OBSTACLES

CROSS-REFERENCE TO RELATED APPLICATIONS

The present application is a continuation of U.S. application Ser. No. 18/299,928, filed 2023 Apr. 13, which claims priority to Provisional U.S. Application 63/482,183 filed 2023 Jan. 30 naming inventors Marek Hustava and Pavel Kostelnik, and further claims priority to Provisional U.S. Application 63/482,188 also filed 2023 Jan. 30 and also naming inventors Marek Hustava and Pavel Kostelnik. The foregoing applications are each hereby incorporated herein by reference in their entirety.

BACKGROUND

Modern automobiles are equipped with an impressive number and variety of sensors. For example, cars are now routinely equipped with arrays of ultrasonic sensors to monitor distances between the car and any nearby persons, pets, vehicles, or obstacles. Due to noise and safety concerns, each of the sensors may be asked to provide tens of measurements each second while the car is in motion. It is important for such sensor arrays to perform reliably, even in environments that change in complex ways. Seemingly small differences, such as temperature variation or aging of the sensor components, can significantly change the sensor's response characteristics.

Ultrasonic sensors as well as other forms of acoustic sensors are often configured to both transmit acoustic bursts and to receive the resulting reflections or "echoes". The acoustic transducers employed by such sensors are subject to residual reverberation of the transducer as well as structural noise (i.e., vibration of any housing or overlying surface), which can blind the sensor to reflections from nearby obstacles. The authors have found these effects to be strongly temperature dependent and subject to other parameter variations of the sensor components including those due to aging, making it difficult to provide reliable minimum distance detection and consistent distance measurements to nearby obstacles (e.g., within 15 cm, or optionally within 10 cm, within 5 cm, within 3 cm, or within 2 cm).

SUMMARY

Accordingly, there are disclosed herein illustrative sensor controllers, sensors, sensing systems, and sensing methods that at least partly address the issues identified above. As one example, an illustrative controller includes: a transmitter to drive an acoustic transducer to generate a first acoustic burst and a second acoustic burst; a receiver coupled to the acoustic transducer to sense a first response to the first acoustic burst and a second response to the second acoustic burst; and a processing circuit to derive output data from the first and second responses in part by determining an offset frequency difference between the first and second responses, wherein the first acoustic burst has a first characteristic frequency and the second acoustic burst has a second characteristic frequency different from the first characteristic frequency.

As another example, an illustrative obstacle detection method includes: sensing an acoustic transducer's response to each acoustic burst in a series of acoustic bursts, the series including a first acoustic burst and a second acoustic burst; determining an offset frequency difference between a response to the first acoustic burst and a response to the second acoustic burst, wherein the first acoustic burst has a first characteristic frequency and the second acoustic burst has a second characteristic frequency different from the first characteristic frequency; and operating on the difference to detect any nearby obstacles.

As yet another example, an illustrative sensor includes: an acoustic transducer; and a controller coupled to the acoustic transducer to generate a series of acoustic bursts having alternating offsets in frequency and to measure the acoustic transducer's response to each acoustic burst in the series, the controller being configured to determine an offset frequency difference between each pair of responses to adjacent acoustic bursts in the series, the offset frequency difference having a magnitude sensitive to the presence of any nearby obstacles.

Each of the foregoing examples can be employed individually or in conjunction, and may include one or more of the following features in any suitable combination: 1. the transmitter is configured to drive the acoustic transducer to generate a third acoustic burst, the third acoustic burst having the first characteristic frequency. 2. the receiver is configured to sense a third response to the third acoustic burst, and the processing circuit is configured to determine an aligned frequency difference between the first and third responses. 3. the processing circuit is configured to compare a magnitude of the offset frequency difference and/or the aligned frequency difference to a threshold to determine whether a nearby obstacle is present. 4. the processing circuit is configured to compare a magnitude of the offset frequency difference and/or the aligned frequency difference to a threshold to determine a distance to a nearby obstacle. 5. the receiver is configured to down-convert a receive signal to a baseband signal and to apply a correlation filter as part of said sensing. 6. the first and second acoustic bursts are adjacent in a series of acoustic bursts having characteristic frequencies that alternate between the first characteristic frequency and the second characteristic frequency. 7. the first acoustic burst and the second acoustic burst each have a burst length that is less than 50% of other acoustic bursts generated by the acoustic transducer to detect more distant obstacles. 8. each of the acoustic bursts are up-chirps or down-chirps. 9. the controller is configured to determine said offset frequency difference in each of multiple separate frequency bands.

BRIEF DESCRIPTION OF THE DRAWINGS

FIG. 4 is a block diagram of an illustrative sensor controller with single-channel sensing.

DETAILED DESCRIPTION

It should be understood that the drawings and following description do not limit the disclosure, but on the contrary, they provide the foundation for one of ordinary skill in the art to understand all modifications, equivalents, and alternatives falling within the scope of the claim language. Ultrasonic sensors are used to provide an explanatory context, but the principles can apply to sonar systems, radar systems, and indeed any systems employing pulse-echo sensing techniques.

Figure 1:
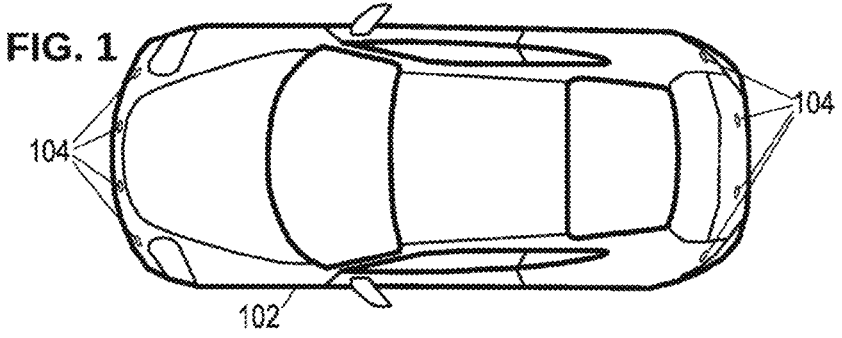
FIG. 1 is an overhead view of an illustrative vehicle equipped with ultrasonic sensors.

As an illustrative usage context, FIG. 1 shows a vehicle 102 equipped with a set of ultrasonic sensors 104. The number and configuration of sensors in the sensor arrangement varies, and it would not be unusual to have six sensors on each bumper with additional sensors on each side for blind-spot detectors. The vehicle may employ the sensor arrangement for detecting and measuring distances to objects in the various detection zones, potentially using the sensors for individual measurements as well as cooperative (e.g., triangulation, multi-receiver) measurements.

The ultrasonic sensors are transceivers, meaning that each sensor can transmit and receive bursts of ultrasonic sound. Emitted bursts propagate outward from the vehicle until they encounter and reflect from an object or some other form of acoustic impedance mismatch. The reflected bursts return to the vehicle as "echoes" of the emitted bursts. The times between the emitted bursts and received echoes are indicative of the distances to the reflection points. In many systems, only one sensor transmits at a time, though all of the sensors may be configured to measure the resulting echoes. However multiple simultaneous transmissions can be supported through the use of orthogonal waveforms, transmissions to non-overlapping detection zones, or transmissions with signatures that enable screening of any echoes from different transmitters.

In various implementations, use is made of chirp-modulated signals, for instance a linear frequency modulated ("LFM") chirp. A chirp is a pulse that changes frequency during transmission. An up-chirp is a signal pulse that increases in frequency during transmission, and a downchirp is a signal pulse that decreases in frequency during transmission. For clarity, the examples used herein will consider a linear increase or decrease, however in various implementations the increase or decrease is not linear. The echo of a chirp may be compressed in a correlator without introducing much or any correlation noise. As such, peak detection of the echo is eased without decreasing time resolution. Additionally, LFM chirps withstand Doppler frequency shift without, or with a minimum of, any increase in correlation noise. LFM chirps can be used as transmit pulses for measuring a distance to an obstacle, or object, situated in the sensing range of a sensor system.

In other implementations, use is made of amplitude-modulated (AM) signals, for instance a shaped pulse of a fixed-frequency carrier. AM signaling mode may enable the use of shorter bursts (e.g., on the order of 200 to 300 microseconds), reducing transmission time and increasing sensitivity to nearby obstacles. Other implementations may employ pulses with modulated carriers, e.g., modulated with binary phase shift keying (BPSK). For sake of clarity, the term "burst" as used herein refers to an AM (fixed-frequency), BPSK (modulated), or chirp (swept frequency) pulse, which may be one of a series of bursts created by driving a piezoelectric element or other acoustic transducer. Chirp-modulated pulses may have a longer duration than a typical AM pulse, for instance more than 1 millisecond, such as in the range of 2-3 milliseconds. It is noted here that burst lengths can be varied, with shorter bursts being used to facilitate detection of nearby obstacles and longer bursts being used to increase burst energy (and echo energy) for more distant obstacles. Burst lengths for detecting nearby obstacles may be half or perhaps a quarter of the burst lengths used for more distant obstacles. The sensor may be switched between modes for different detection distances.

Although it is deemed particularly useful to systematically vary a characteristic frequency (e.g., the starting frequency or, equivalently, the center or ending frequency) of the chirp-modulated pulses in a series, such frequency variation can also be applied to the carrier frequency of the AM pulses in a series. The frequency variation can be expressed for each pulse as a frequency displacement from a nominal characteristic frequency (e.g., a nominal starting frequency or nominal carrier frequency).

Figure 2:
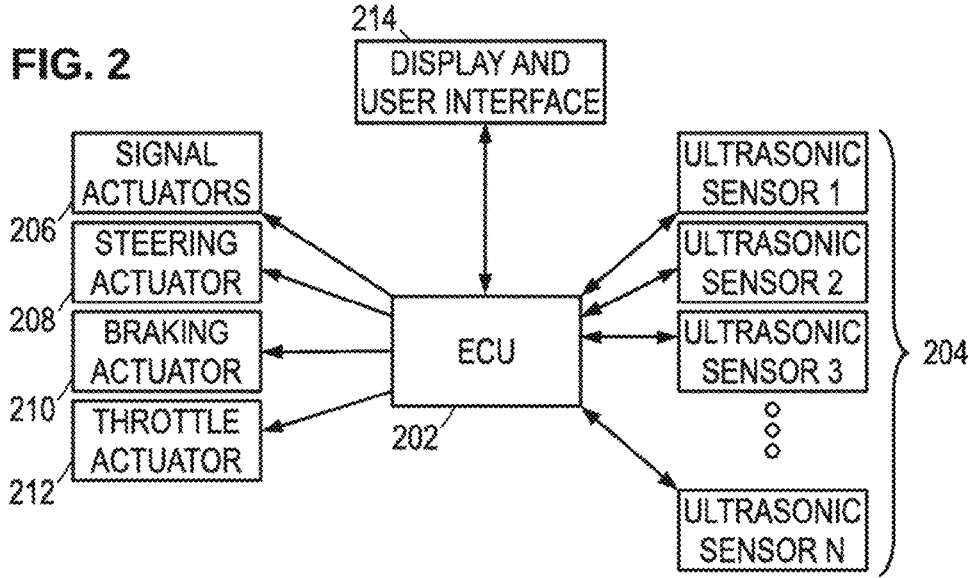
FIG. 2 is a block diagram of an illustrative driving/parking assist system.

FIG. 2 shows an electronic control unit (ECU) 202 coupled to the various ultrasonic sensors 204 as the center of a star topology. Of course, other topologies including serial, parallel, and hierarchical (tree) topologies, are also suitable and contemplated for use in accordance with the principles disclosed herein. To provide automated parking or driving assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements and system status. Using the interface, sensors, and actuators, ECU 202 may provide automated parking, assisted parking, lane-change assistance, obstacle and blind-spot detection, and other desirable features.

Figure 3:
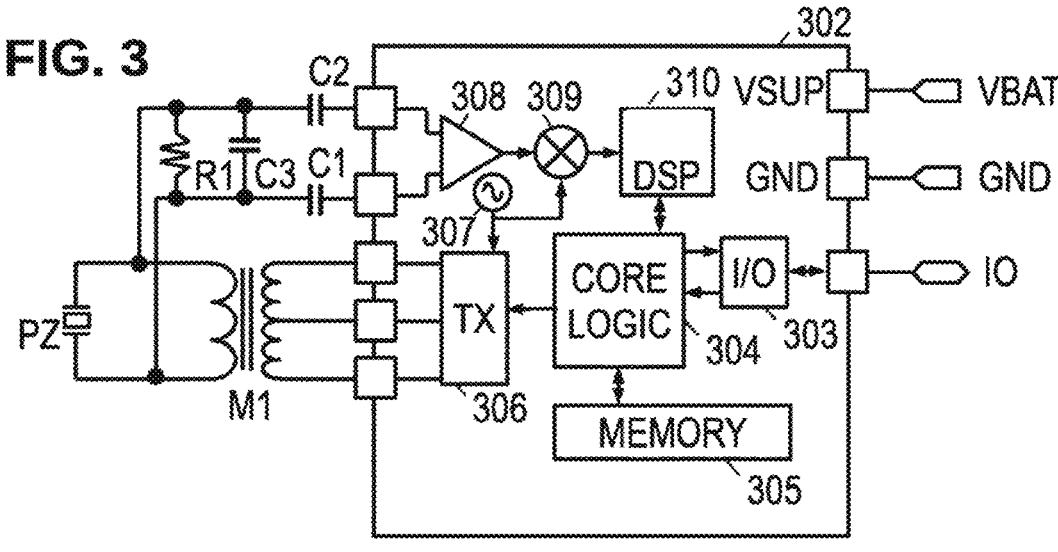
FIG. 3 is a circuit schematic of an illustrative acoustic obstacle sensor.

One potential sensor configuration is now described with reference to FIG. 3. The illustrated sensor configuration employs the DSI3 communication and power supply standard, but other communication techniques such as those provided in the LIN, CAN, and SENT standards would also be suitable and are contemplated for use in accordance with the principles disclosed herein. Besides the two power terminals (Vbat and GND) shown in the implementation of FIG. 3, each of the illustrative ultrasonic sensors is only connected to the ECU 202 by a single input/output ("I/O" or "IO") line. The I/O line may be biased to the supply voltage (the "de-asserted" state) by a pull-up resistor when it is not actively driven low (the "asserted" state) by the ECU 202 or by the sensor controller 302. The communication protocol is designed to have only one of the two controllers (ECU 202 or sensor controller 302) asserting the I/O line at any given time.

The sensor controller 302 includes an I/O interface 303 that, when placed in a recessive mode, monitors the I/O line for assertion by the ECU 202 and, when placed in a dominant mode, drives the state of the I/O line. The ECU communicates a command to the sensor by asserting the I/O line, the different commands being represented by assertions of different lengths. The commands may include a "send and receive" command, a "receive only" command, and a "data mode" command.

The sensor controller 302 includes a core logic 304 that operates in accordance with firmware and parameters stored in nonvolatile memory 305 to parse commands from the ECU and carry out the appropriate operations, including the transmission and reception of ultrasonic bursts. To transmit an ultrasonic burst, the core logic 304 is coupled to a transmitter 306 which, with a suitably modulated local oscillator signal from a voltage controlled oscillator 307, drives a set of transmit terminals on the sensor controller 302. The transmitter terminals are coupled via a transformer M1 to a piezoelectric element PZ. The transformer M1 steps up the voltage from the sensor controller (e.g., 12 volts) to a suitable level for driving the piezoelectric element (e.g., tens of volts). The piezoelectric element PZ has a resonance frequency that is tuned to a desirable value (e.g., 48 kHz) with a parallel capacitor C3, and has a resonance quality factor (Q) that is tuned with a parallel resistor R1. One illustrative purpose of the tuning capacitor and tuning resistor is to tune the parallel resonance frequency close to the series resonant frequency of the piezoelectric element.

As used herein, the term "piezoelectric transducer" includes not only the piezoelectric element, but also the supporting circuit elements for tuning, driving, and sensing, the piezoelectric element. In the illustrative implementation, these supporting elements are the transformer M1, the tuning resistor and tuning capacitor, and the DC-isolation capacitors. Optionally, output and input capacitance of the transmitter 306 and amplifier 308, respectively, may also be included as parasitic characteristics of the supporting circuit elements considered to be part of the transducer. In the illustrated implementation, a pair of DC-isolation capacitors C1, C2 couple the piezoelectric element to the sensor controller's pair of receive terminals to protect against high voltages. Further protection is provided with internal voltage clamps on the receive terminals. Such protection may be desired for the intervals when the piezoelectric element is transmitting.

Commands received via the I/O line trigger the core logic 304 to operate the transmitter and receiver and to provide the measurement results to the ECU 202 via the I/O line, also referred to herein as a communication bus. The measurement results are herein also referred to as output data. The core logic 304 may monitor other sensor conditions such as having the supply voltage "under-voltage" or "over-voltage" while transmitting an ultrasonic burst, thermal shutdown of transmitter, a hardware error, an incomplete power-on reset, or the like. The core logic 304 may detect and classify multiple such transducer fault states and error conditions, storing the appropriate fault codes in internal registers or nonvolatile memory 305.

As the received echo signals are typically in the millivolt or microvolt range, a front-end amplifier 308 buffers and amplifies the signal from the receive terminals. Subsequently, the received echo signals are processed by an analog-to-digital converter (ADC) and down-converted by a digital mixer 309. Mixer 309 multiplies the amplified and digitized receive signal with the local oscillator signal to down-convert the modulated signal to baseband, for further filtering and processing by a digital signal processor (DSP) 310. The mixer 309 is in one implementation an in-phase/ quadrature (I/Q) digital mixer giving Zero Intermediate Frequency (ZIF) IQ data as its output. (Though the term "ZIF" is used herein, the downconverted signal may in practice be a low intermediate frequency or "near-baseband" signal.)

DSP 310 applies programmable methods to monitor the piezoelectric transducer during the transmission of a burst, and to detect any echoes and measure their parameters such as time-of-flight (ToF), duration, and peak amplitude. Such methods may employ threshold comparisons, minimum intervals, peak detections, zero-crossing detection and counting, noise level determinations, and other customizable techniques tailored for improving reliability and accuracy. Notably, the peak detection process itself has variations, with some variations performing rising edge detection, falling edge detection, or detection of the peak maximum. The DSP 310 may further process the amplified receive signal to analyze characteristics of the transducer, such as resonance frequency and quality factor, and may further detect transducer fault states.

As mentioned above, the mixer 309 is in one implementation a quadrature mixer. This I/Q digital mixer 309 has an input connected to the output of an analog-to-digital converter (not shown), an input for receiving a mixing signal $F_{TX}$, and first and second outputs for providing an in-phase signal and a quadrature signal, respectively, that corresponds to an amplitude and a phase of the signal input from the acoustic transducer in the complex plane. The DSP 310 may include one or more digital filters that are configured to retrieve and use filter coefficients stored in memory for operating on the ZIF-IQ signal. More particularly, the digital filters may include low-pass filters and correlators. The DSP may include programmable modules or dedicated circuitry for other operations, including phase derivation, magnitude measurement, down sampling, amplitude scaling (attenuation control), noise suppression, peak detection, reverberation monitoring, and transducer diagnostics, and an interface for host communications.

Figure 4:
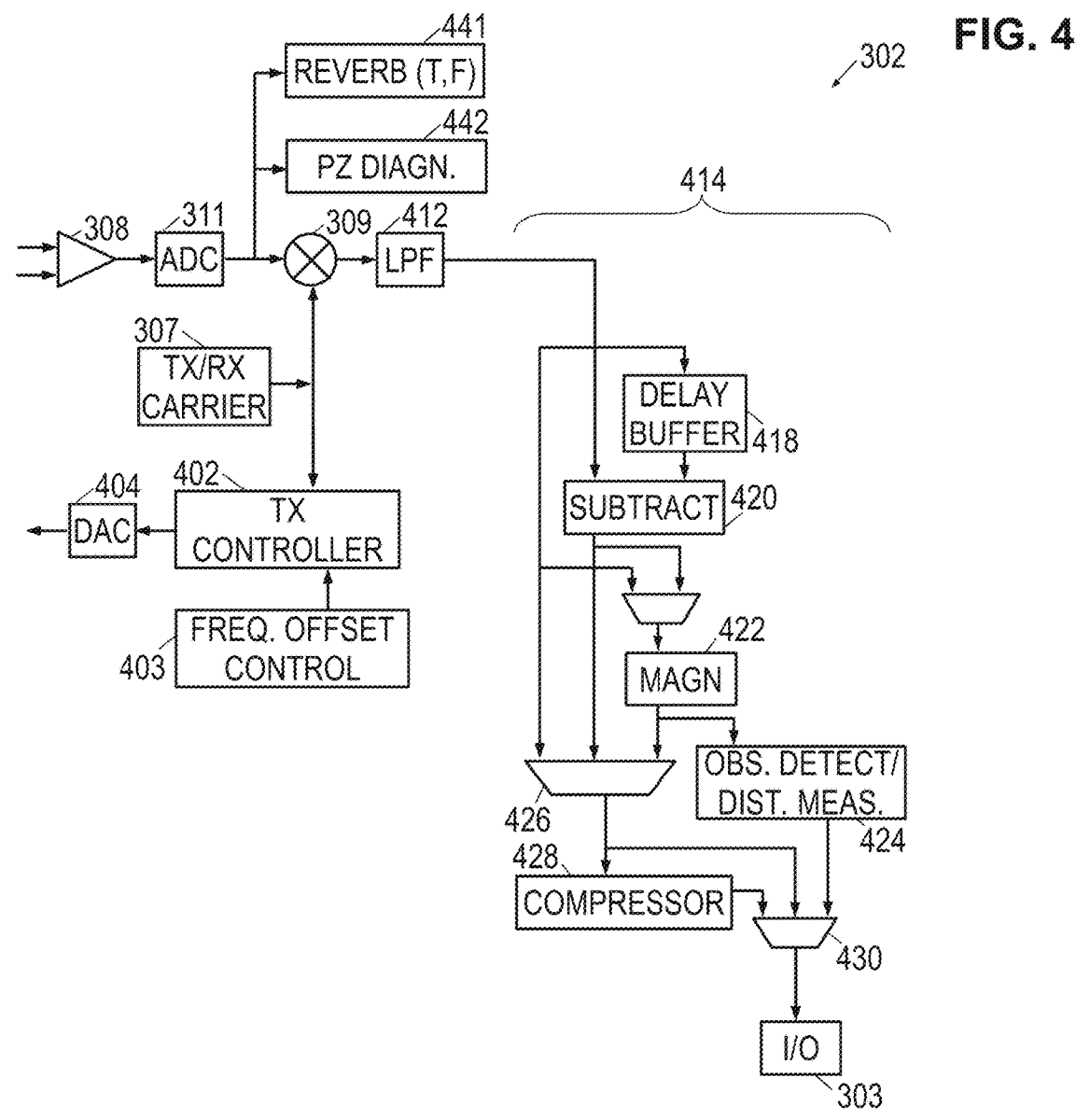

FIG. 4 is a block diagram of the controller 302 in an illustrative single channel implementation. Processing for nearby obstacle detection may be performed entirely in the controller 302, or may be shared with or delegated to an ECU or host processor, which receives certain data via the communications bus as previous described with reference to FIGS. 2 and 3. For the sake of simplicity, FIG. 4 does not show all features of the controller 302, such as for instance the power electronics section.

As discussed above with reference to FIG. 3, the controller 302 includes both a receiver and a transmitter as well as a processing circuit coupled to the receiver for conversion of a received response into output data. The processing circuit may be implemented as application specific circuitry or as programmable modules in a digital signal processor (DSP).

An oscillator 307 for generating a carrier frequency signal is coupled to a transmit controller 402 and to the mixer 309. The oscillator 307 may provide, e.g., a nominal carrier frequency of 50 kHz. The TX controller 402 uses the carrier frequency signal to derive a series of AM or chirp burst signals, applying a frequency offset as specified by frequency offset controller 403. In the illustrated single-channel implementation, the non-offset chirp burst signals may be frequency swept upward from 7 kHz below the carrier frequency to 7 kHz above the carrier frequency. A down chirp can be alternatively employed in place of the up chirp. A digital to analog converter 404 converts the digital acoustic bursts into an analog drive signal for the acoustic transducer.

The frequency offset controller 403 is configured to apply frequency displacements to the characteristic frequency (e.g., carrier frequency for AM bursts, or starting frequency for chirp bursts) of the digital burst signals. Such frequency displacements are for instance in the range of 200-2000 Hz, preferably 300-1200 Hz, such as 600-1000 Hz, or 800 Hz, or 900 Hz. The displacements of the characteristic frequency cause corresponding Doppler-like frequency shifts in the echoes of the acoustic bursts.

After each acoustic burst, the controller 302 receives an input signal representing the response of acoustic transducer PZ (FIG. 3) optionally amplified by a front-end amplifier 308. An analog to digital converter (ADC) 311 digitizes the input signal at a relatively high sampling rate, e.g., 400 kHz. A diagnostic block 442, alone or in combination with a reverberation monitor block 441, analyzes the digitized response signal to detect and diagnose any transducer fault conditions. Some fault conditions may be indicated by, e.g., an excessively short reverberation period (which may be due to a disconnected or defective transducer, suppressed vibration, or the like), while others may be indicated by an excessively long reverberation period (defective mounting, inadequate damping resistance, or the like). The diagnostic block 442 may detect and classify multiple such transducer fault conditions, storing the appropriate fault codes in internal registers from whence they may be communicated to the ECU. Reverberation monitor block 441 detects and signals the end of the transducer reverberation period, optionally initiating the signal processing for echo detection.

The digitized response is subsequently down-converted in digital I/Q mixer 309. Digital I/Q mixer 309 shifts the input signal to sum and difference frequencies, in which the difference frequency is near baseband (zero intermediate frequency). I/Q digital mixer 309 outputs a baseband signal having both an in-phase component and a quadrature component of the received signal. A lowpass filter (LPF) 412 is arranged downstream of the mixer 309 to remove certain noise components (including the input signal image at the sum frequency) from the downconverted response. The filtered signal may be referred to herein as the ZIF IQ data.

Illustrative controller 302 includes processing circuitry 414 most of which can be bypassed (via multiplexers 426, 430) if desired to convey the ZIF IQ data off chip via I/O interface 303 to enable the ECU or host processor to process the signals, e.g., analyzing the timing of peaks in the signal to determine the travel time of reflections and thus the distance to obstacles. Peak magnitude and width may also be analyzed to determine significance. To reduce I/O bandwidth requirements, a compressor block 428 may be included to reduce the number of bits needed to represent the ZIF IQ data or to represent the output of the magnitude block 422, which converts IQ component data into signal magnitude. (Magnitude block 422 may operate by squaring the in-phase component signal, squaring the quadrature-phase component signal, and summing the two, optionally taking a square root or logarithm of the summed signal.) To even further reduce bandwidth requirements, the controller 302 may perform on-chip processing with a detection block 424, which may perform peak detection and distance estimation processing.

As mentioned in the background, the sensors are subject to residual reverberation of the transducer as well as structural noise that mask echoes from nearby obstacles. The authors have found these effects to be strongly temperature dependent and subject to other parameter variations of the sensor components including those due to aging. However, for "concealed" sensors mounted behind fenders or other overlying surfaces, these effects have also been found to be largely independent of the acoustic burst's characteristic frequency. Because echoes are sensitive to the characteristic frequency while the structural noise is not, the sensor's ability to provide reliable detection of nearby obstacles can be enhanced by determining the difference between transducer responses to acoustic bursts having different characteristic frequencies.

The illustrated controller 302 accordingly includes a delay buffer 418 in each branch of the processing circuitry to capture the ZIF IQ data from each burst, making the data from the previous burst available for a subtraction element 420 to determine the difference between the ZIF IQ data from adjacent bursts having different frequency offsets. Being insensitive to frequency, the structural noise is substantially removed, whereas the echoes are enhanced. The difference signal can be passed to the compressor or I/O interface for off-chip processing, or passed to the magnitude block 422 and the detection block 424 for on-chip detection of nearby obstacles.

Figure 5:
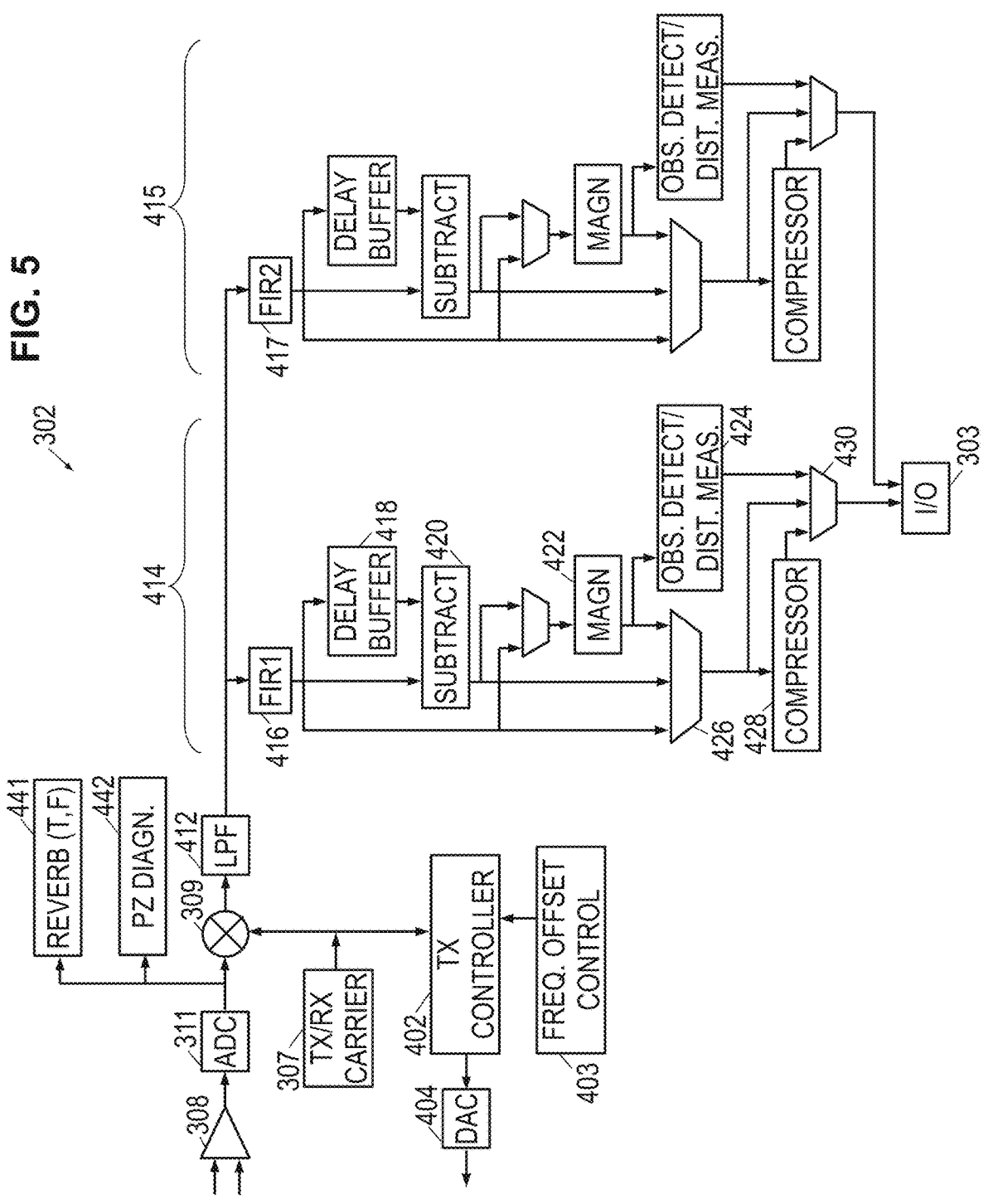
FIG. 5 is a block diagram of an illustrative sensor controller with multi-channel sensing.

FIG. 5 is a block diagram of controller 302 in an illustrative multi-channel implementation with the processing circuitry having a branch 414, 415 for each channel. The transmit controller 402 may be configured to generate a lower channel chirp that is frequency swept upward from 7 kHz below the carrier frequency to 1 kHz below the carrier frequency and an upper channel chirp that is swept from 1 kHz above the carrier frequency to 7 kHz above the carrier frequency. A down chirp can alternatively be employed in place of any or all of the up chirps. Depending on the system configuration, the TX controller 402 may operate solely in one channel, or may alternate or otherwise employ both upper and lower channels. Each branch may be provided with a corresponding channel filter 416, 417 to limit the signal spectrum of the ZIF IQ data to that channel's frequency range. The previously-described processing steps can then be performed on that portion of the ZIF IQ data energy that resides within the corresponding channel. The filters may each take the form of a programmable finite impulse response filter (FIR) with complex-valued coefficients retrievable from memory. Though not shown here, the processing circuitry can be configured with additional filters to provide correlation or matched-response filtering to enhance signal to noise ratio.

It is noted here that the single channel implementation (FIG. 4) maximizes sensitivity to nearby obstacles and may accordingly be particularly well suited to detecting such obstacles and providing an alert or setting a flag to indicate that such an obstacle has been detected. This implementation works with detecting nearby obstacles even so close as to be essentially 0 cm from the transducer, and the resulting detection flag may be referred to as the 0 cm flag. The multi-channel implementation (FIG. 5) may lose some detection sensitivity such that reliable detection can require a larger minimum distance from the transducer, but in return the multi-channel measurements can provide more accurate determination of distance to any nearby obstacles that are present.

Figure 6:
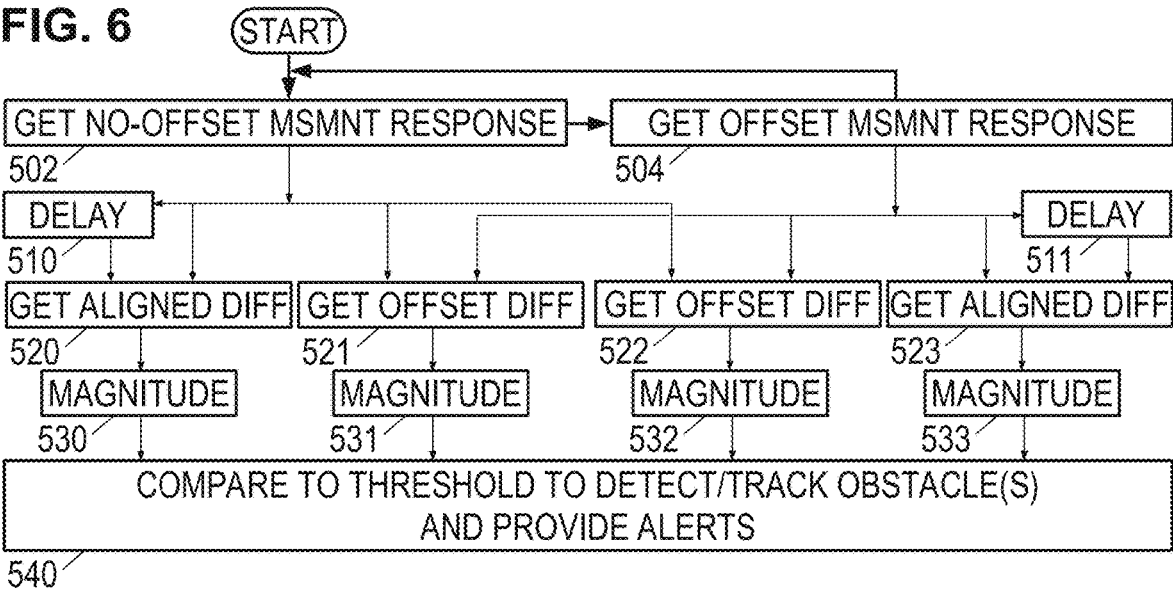
FIG. 6 is a flow diagram of a first illustrative sensing method for nearby obstacles.

FIG. 6 is a flow diagram of a first illustrative sensing method that exploits the characteristic frequency insensitivity of the transducer's structural noise to provide enhanced proximity sensing. While the method may be implemented by the ECU, by the sensor controller, or distributed across both, the following description uses the controller for explanatory purposes.

In block 502, the controller obtains a response to a first acoustic burst transmitted without any frequency offset, then in block 504 obtains a response to a second acoustic burst sent with a frequency offset, e.g., 900 Hz. In some implementations, the controller scales the response with the frequency offset if the transducer's response is sensitive to the frequency offset. The controller cycles through blocks 502 and 504, obtaining a series of responses with alternating frequency offsets. Blocks 510 and 511 respectively buffer the responses obtained in blocks 502 and 504, making them available for subtraction from later responses.

In block 520, the controller subtracts the previous response to an acoustic burst with no frequency offset from the current response to an acoustic burst with no frequency offset. Because both bursts have the same frequency offset (i.e., no frequency offset), the output of block 520 is referred to as an aligned frequency difference signal. In block 521, the controller subtracts the response signal from the previous acoustic burst with a frequency offset from the current response to an acoustic burst with no frequency offset. Because the bursts have different frequency offsets, this difference signal is referred to as an offset frequency difference signal. More formally, the term "offset frequency difference signal" is used herein to refer to a difference between ZIF IQ signals obtained from adjacent transmit bursts having offset characteristic frequencies. In blocks 522 and 523, the controller similarly produces offset frequency and aligned frequency difference signals using the response from block 504 as the current response signal, such that the controller determines an offset frequency difference and aligned frequency difference signal from each measured response.

Because the structural noise is insensitive to the frequency offset, it is absent from the offset frequency and aligned frequency difference signals. (The structural noise sensitivity to temperature and other factors is negated by the use of adjacent acoustic bursts, because temperature and other factors have no significant variation in the small interval between bursts.) The echoes from any nearby obstacles, however, are sensitive to the frequency offset, causing them to be enhanced in the offset frequency difference signal unless the obstacle moves in a manner producing a Doppler shift that happens to cancel the effect of the frequency offset. Conversely, the echoes of any nearby obstacles should be absent from the aligned frequency difference signal unless the obstacle is moving. As a precaution then, both the offset frequency difference signal and the aligned frequency difference signal may be evaluated to determine whether a nearby obstacle exists (e.g., within 15 cm, or optionally within 10 cm, within 5 cm, within 3 cm, or within 2 cm).

Accordingly, in blocks 530-533, the controller converts the IQ components of the various difference signals into magnitude signals, and in block 540 the controller compares the magnitude signals to a threshold to detect any peaks representing echoes from obstacles. The threshold may vary with elapsed time to account for expected attenuation of echoes returning from greater distances. Upon detecting any peaks representing obstacles that are too close, the controller may provide an alert to the ECU or to the driver. In some implementations, the controller determines the obstacle distance associated with each peak.

Figure 7:
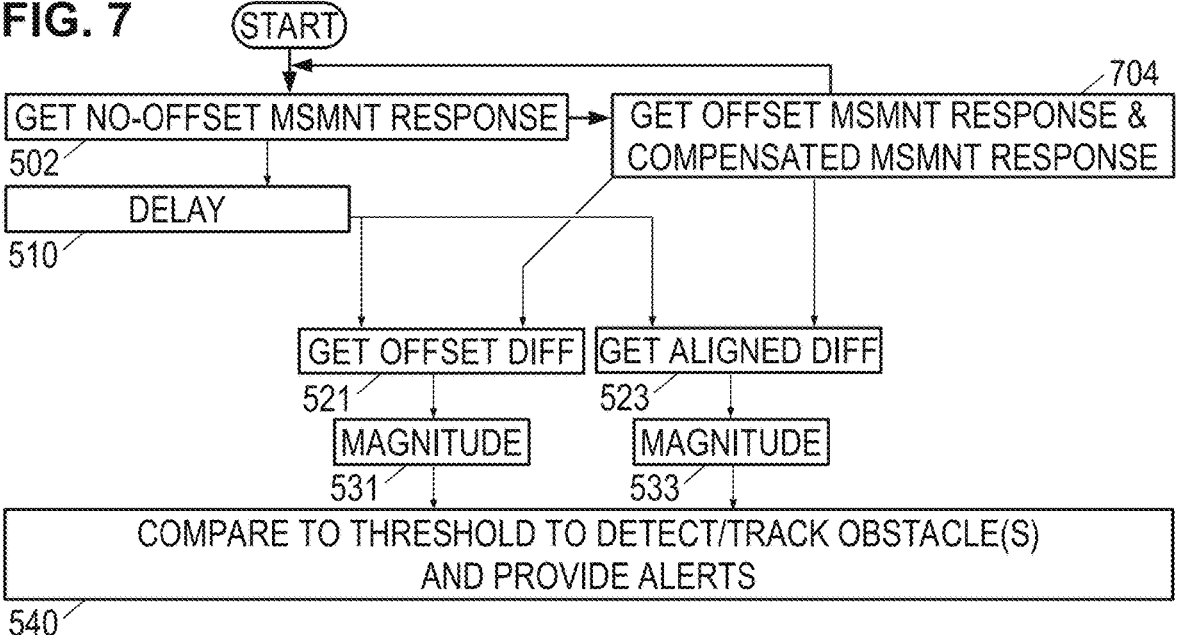
FIG. 7 is a flow diagram of a second illustrative sensing method for nearby obstacles.

The illustrative sensing method of FIG. 5 derives aligned frequency difference signals from non-adjacent acoustic bursts. FIG. 7 provides a second illustrative method that derives offset frequency difference signals and aligned frequency difference signals from a given pair of adjacent acoustic bursts. As with the first method, the controller obtains a response to a first acoustic burst transmitted without any frequency offset in block 502, then in block 704 obtains a response to a second acoustic burst sent with a frequency offset, e.g., 900 Hz. Additionally in block 704, the controller obtains a compensated response to the second acoustic burst. The compensated response can be obtained, for example, by adjusting the local oscillator signal supplied to mixer 309 so that it matches the characteristic frequency of the transmitted burst and repeating the down-conversion using the adjusted local oscillator signal. (Alternatively, a second mixer element may be used to enable both down-conversions to be performed in parallel.) The controller may scale the response with the frequency offset and the compensated response if the transducer's response is sensitive to the frequency offset. The controller cycles through blocks 502 and 704, obtaining a series of responses to bursts with alternating frequency offsets.

Block 510 buffers the non-offset response obtained in block 502, making it available to blocks 521 and 523 for subtraction from the responses obtained in block 704. In block 521, the controller subtracts the buffered response signal from the offset response signal to obtain an offset frequency difference signal, while in block 523 the controller subtracts the buffered response signal from the compensated response signal to obtain an aligned frequency difference signal. In blocks 531, 533, the controller converts the IQ components of the various difference signals into magnitude signals, and in block 540 the controller compares the magnitude signals to a threshold to detect any peaks representing echoes from obstacles. The threshold may vary with elapsed time to account for expected attenuation of echoes returning from greater distances. Upon detecting any peaks representing obstacles that are too close, the controller may provide an alert to the ECU or to the driver. In some implementations, the controller determines the obstacle distance associated with each peak.

The described methods are for a single channel system. In a multi-channel system, the processing may be performed in a selected channel or may be performed in all of the channels to enhance distance determination accuracy. Though described in the context of ultrasonic sensing, the disclosed techniques are applicable to radar systems, sonar systems, and more

The invention claimed is:

1. A sensor controller that comprises:
   a transmitter configured to drive an acoustic transducer to generate a first acoustic burst having a first characteristic frequency and a second acoustic burst having a second characteristic frequency, the second characteristic frequency being offset from the first characteristic frequency;
   a receiver configured to sense a response to each of the first acoustic burst and the second acoustic burst, each response including a structural noise component; and
   a processing circuit configured to subtract the response to the first acoustic burst from the response to the second acoustic burst to obtain an offset frequency difference in which the structural noise components at least partly cancel each other.

2. The sensor controller of claim 1, wherein the transmitter is configured to drive the acoustic transducer to generate a third acoustic burst, the third acoustic burst having the first characteristic frequency, wherein the receiver is configured to sense a response to the third acoustic burst, and wherein the processing circuit is configured to determine a difference between the response to the first acoustic burst and the response to the third acoustic burst to obtain an aligned frequency difference having enhanced sensitivity to any moving obstacle.

3. The sensor controller of claim 2, wherein the processing circuit is configured to compare a magnitude of the offset frequency difference and a magnitude of the aligned frequency difference to a threshold to detect any nearby obstacles.

4. The sensor controller of claim 1, wherein a third response is obtained from the second acoustic burst, the third response accounting for an offset between the first characteristic frequency and the second characteristic frequency, wherein the processing circuit is configured to determine a difference between the third response and the response to the first acoustic burst to obtain an aligned frequency difference, and wherein the processing circuit is configured to compare a magnitude of the offset frequency difference and a magnitude of the aligned frequency difference to a threshold to detect any nearby obstacles.

5. The sensor controller of claim 1, wherein the processing circuit is configured to compare a magnitude of the offset frequency difference to a threshold to detect any nearby obstacles.

6. The sensor controller of claim 1, wherein the processing circuit is configured to compare a magnitude of the offset frequency difference to a threshold to determine a distance to an obstacle.

7. The sensor controller of claim 1, wherein the first acoustic burst and the second acoustic burst are adjacent in a series of acoustic bursts having characteristic frequencies that alternate between the first characteristic frequency and the second characteristic frequency.

8. The sensor controller of claim 1, wherein the first acoustic burst and the second acoustic burst each have a burst length that is shorter than acoustic bursts generated by the acoustic transducer to detect more distant obstacles.

9. A sensing method that comprises:

sensing a response of an acoustic transducer to a first acoustic burst having a first characteristic frequency and a response to a second acoustic burst having a second characteristic frequency, each response including a structural noise component, the second characteristic frequency being an offset frequency from the first characteristic frequency;

subtracting the response to the first acoustic burst from the second acoustic burst to obtain an offset frequency difference in which the structural noise components at least partly cancel each other; and determining whether an obstacle is nearby based at least in part on the offset frequency difference.

10. The sensing method of claim 9, further comprising:

sensing a response to a third acoustic burst having the first characteristic frequency; and determining a difference between the response to the first acoustic burst and the response to the third acoustic burst to obtain an aligned frequency difference, wherein said determining whether an obstacle is nearby is also based in part on the aligned frequency difference.

11. The sensing method of claim 10, wherein said determining includes comparing a magnitude of the offset frequency difference to a threshold and comparing a magnitude of the aligned frequency difference to the threshold.

12. The sensing method of claim 9, further comprising:

obtaining a compensated response to the second acoustic burst, the compensated response accounting for an offset between the first characteristic frequency and the second characteristic frequency; and determining a difference between the response to the first acoustic burst and the compensated response to obtain an aligned frequency difference, wherein said determining whether an obstacle is nearby is also based in part on the aligned frequency difference.

13. The sensing method of claim 9, wherein said determining includes comparing a magnitude of the offset frequency difference to a threshold.

14. The sensing method of claim 9, wherein said determining includes finding a distance to the obstacle.

15. A sensing apparatus that comprises:

a means for sensing a response of an acoustic transducer to a first acoustic burst having a first characteristic frequency and a response to a second acoustic burst having a second characteristic frequency, each response including a structural noise component, the second characteristic frequency being an offset frequency from the first characteristic frequency; and a means for subtracting the response to the first acoustic burst from the second acoustic burst to obtain an offset frequency difference in which the structural noise components are at least partly canceled.

16. The sensing apparatus of claim 15, further comprising:

a means for determining a difference between the response to the first acoustic burst and a response to a third acoustic burst having the first characteristic frequency to obtain an aligned frequency difference having reduced structural noise.

17. The sensing apparatus of claim 16, further comprising:

a means for determining whether an obstacle is nearby based at least in part on the aligned frequency difference.

18. The sensing apparatus of claim 15, further comprising:

a means for obtaining a compensated response to the second acoustic burst, the compensated response accounting for an offset between the first characteristic frequency and the second characteristic frequency; and a means for determining a difference between the response to the first acoustic burst and the compensated response to obtain an aligned frequency difference.

19. The sensing apparatus of claim 18, further comprising:

a means for determining whether an obstacle is nearby based at least in part on the aligned frequency difference.

20. The sensing apparatus of claim 15, further comprising:

a means for determining whether an obstacle is nearby based at least in part on the offset frequency difference.

* * * * *